(12) United States Patent
Chen et al.

(10) Patent No.: US 11,623,821 B2
(45) Date of Patent: Apr. 11, 2023

(54) DISTRIBUTION SITE AND DISTRIBUTION METHOD

(71) Applicant: BEIJING JINGDONG QIANSHI TECHNOLOGY CO., LTD., Beijing (CN)

(72) Inventors: Ying Chen, Beijing (CN); Jun Xiao, Beijing (CN); Yafang Zhang, Beijing (CN); Zhao Wang, Beijing (CN); Jian Zhang, Beijing (CN); Qiang Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/278,113

(22) PCT Filed: Aug. 2, 2019

(86) PCT No.: PCT/CN2019/099072
§ 371 (c)(1),
(2) Date: Mar. 19, 2021

(87) PCT Pub. No.: WO2020/057271
PCT Pub. Date: Mar. 26, 2020

(65) Prior Publication Data
US 2021/0347568 A1 Nov. 11, 2021

(30) Foreign Application Priority Data
Sep. 21, 2018 (CN) .......................... 201811106165.1

(51) Int. Cl.
*B65G 1/04* (2006.01)
*B65G 1/10* (2006.01)
(Continued)

(52) U.S. Cl.
CPC ............ *B65G 1/0492* (2013.01); *B65G 1/045* (2013.01); *B65G 1/0435* (2013.01); *B65G 1/10* (2013.01);
(Continued)

(58) Field of Classification Search
CPC .... B65G 1/0492; B65G 1/0435; B65G 1/045; B65G 1/10; B65G 67/04
See application file for complete search history.

(56) References Cited

U.S. PATENT DOCUMENTS 9,120,624 B1 9/2015 Cassady et al.
9,384,668 B2 7/2016 Raptopoulos et al.
(Continued)

FOREIGN PATENT DOCUMENTS

CN 203781154 U 8/2014
CN 104763196 A 7/2015
(Continued)

OTHER PUBLICATIONS

Chinese Office Action dated Aug. 17, 2021 in Chinese Patent Application No. 201811106165.1 (with English language translation), 14 pages.
(Continued)

*Primary Examiner* — Saul Rodriguez
*Assistant Examiner* — Willie Berry, Jr.
(74) *Attorney, Agent, or Firm* — Oblon, McClelland, Maier & Neustadt, L.L.P.

(57) ABSTRACT

A distribution site and a distribution method are provided. The distribution site includes: a building having a storage space configured to store goods and a distribution interface area configured to park an unmanned ground distribution vehicle that is capable of performing goods distribution; and a goods sorting device arranged in the building and config-
(Continued)

ured to load the goods in the storage space onto the unmanned ground distribution vehicle.

18 Claims, 5 Drawing Sheets

(51) Int. Cl.
 *B65G 67/04* (2006.01)
 *B65G 69/26* (2006.01)
 *G06Q 10/0835* (2023.01)
(52) U.S. Cl.
 CPC .............. *B65G 67/04* (2013.01); *B65G 69/26* (2013.01); *G06Q 10/0835* (2013.01)

(56) References Cited

U.S. PATENT DOCUMENTS

| | | | |
|---|---|---|---|
| 9,959,773 | B2 | 5/2018 | Raptopoulos et al. |
| 2014/0032034 | A1 | 1/2014 | Raptopoulos et al. |
| 2015/0120094 | A1 | 4/2015 | Kimchi et al. |
| 2016/0104099 | A1 | 4/2016 | Villamar |
| 2016/0163204 | A1 | 6/2016 | Raptopoulos et al. |
| 2016/0280470 | A1* | 9/2016 | Zhang .................. B65G 47/902 |
| 2017/0110017 | A1 | 4/2017 | Kimchi et al. |
| 2017/0116587 | A1* | 4/2017 | Chen ........................ G07F 9/023 |
| 2018/0137454 | A1 | 5/2018 | Kulkarni et al. |
| 2018/0201445 | A1* | 7/2018 | Battles ................. B65G 1/1373 |
| 2018/0253981 | A1 | 9/2018 | Raptopoulos et al. |
| 2019/0168392 | A1 | 6/2019 | Väin et al. |
| 2019/0347942 | A1 | 11/2019 | Kimchi et al. |
| 2020/0353625 | A1 | 11/2020 | Vain et al. |
| 2022/0058965 | A1 | 2/2022 | Kimchi et al. |

FOREIGN PATENT DOCUMENTS

| | | |
|---|---|---|
| CN | 204946194 U | 1/2016 |
| CN | 105787536 A | 7/2016 |
| CN | 106347913 A | 1/2017 |
| CN | 106570667 A | 4/2017 |
| CN | 106855966 A | 6/2017 |
| CN | 106886876 A | 6/2017 |
| CN | 107600861 A | 1/2018 |
| EP | 3 118 786 A1 | 1/2017 |
| JP | 5-229604 A | 9/1993 |
| WO | WO 2015/061008 A1 | 4/2015 |
| WO | WO 2018/094019 A1 | 5/2018 |
| WO | WO 2019/106138 A1 | 6/2019 |

OTHER PUBLICATIONS

Chinese Office Action dated Dec. 2, 2021 in Chinese Patent Application No. 201811106165.1 (with English language translation), 16 pages.
Chinese Office Action dated Mar. 15, 2022 in Chinese Patent Application No. 201811106165.1, 7 pages.
Extended European Search Report dated Apr. 28, 2022 in European Patent Application No. 19862924.8, 7 pages.
International Search Report and Written Opinion dated Nov. 13, 2019 in PCT/CN2019/099072 filed Aug. 2, 2019, 5 pages.
Combined Chinese Office Action and Search Report dated Feb. 26, 2021 in Patent Application No. 201811106165.1 (with English language translation and English translation of Category of Cited Documents), 21 pages.
Extended European Search Report issued in European Patent Application No. 221198707.6 dated Dec. 22, 2022.

\* cited by examiner

DISTRIBUTION SITE AND DISTRIBUTION METHOD

CROSS-REFERENCE TO RELATED APPLICATIONS

The present application is a U.S. National Stage Application under 35 U.S.C. § 371 of International Patent Application No. PCT/CN2019/099072 filed on Aug. 2, 2019, which is based on and claims priority to China Patent Application No. 201811106165.1 filed on Sep. 21, 2018, the disclosure of both of which are incorporated by reference herein in their entirety.

TECHNICAL FIELD

The present disclosure relates to the field of logistics, and in particular to a distribution site and a distribution method.

BACKGROUND

During the distribution and automated storage of goods, logistics is a process of realizing the demands of users by an organic combination of basic functions such as transport, storage, loading and unloading, conveying, distribution, and information processing according to actual requirements during the physical flow of goods from a supplying place to a receiving place. Logistics plays a very important role in modern business.

In the field of logistics, warehouse transfer and goods extracting are very important links. The costs of these links account for a large proportion of the entire logistics cost, so that it is always a direction of research and development within the industry to make technical optimizations to such links. The distribution sites in the related art are generally a plurality of network sites established in cities, and each network site is deployed with relevant staff so that labor is used for transferring goods or helping clients to extract goods.

SUMMARY

In one aspect of the present disclosure, a distribution site is provided. The distribution site includes: a building having a storage space configured to store goods and a distribution interface area configured to park an unmanned ground distribution vehicle that is capable of performing goods distribution; and a goods sorting device arranged in the building and configured to load the goods in the storage space onto the unmanned ground distribution vehicle.

In some embodiments, the distribution interface area is located in the building that is provided with a passage/door communicating the external with the distribution interface area.

In some embodiments, there further includes: a vehicle adjusting mechanism arranged in the distribution interface area and configured to adjust a position of the unmanned ground distribution vehicle entering the distribution interface area, so that the goods sorting device performs loading.

In some embodiments, the vehicle adjusting mechanism includes: a rotary platform configured to rotate about an axis perpendicular to a horizontal plane, so as to adjust an angle of the unmanned ground distribution vehicle above the rotary platform relative to the goods sorting device by rotation.

In some embodiments, there further includes: a visual device arranged in the building and configured to recognize a position of the unmanned ground distribution vehicle entering the distribution interface area, so that the vehicle adjusting mechanism adjusts a position of the unmanned ground distribution vehicle according to a recognition result of the visual device.

In some embodiments, the goods sorting device includes: a track arranged in the building and located between the storage space and the distribution interface area; and a stacking robot running movably along the track, and configured to load the goods in the storage space onto the unmanned ground distribution vehicle.

In some embodiments, the stacking robot includes: a bracket running movably along the track; a rotary seat which is arranged on the bracket, rotatable in a horizontal direction relative to the bracket, and movable linearly in a vertical direction; and an end picker arranged on the rotary seat and configured to pick up or release the goods.

In some embodiments, the rail includes: a first rail arranged on a top ceiling inside the building; and a second rail arranged on a floor inside the building, and parallel to and directly opposite to the first rail.

In some embodiments, the bracket includes: a first sliding block forming a sliding pair with the first rail; a second sliding block forming a sliding pair with the second rail; and a support rod arranged upright between the first sliding block and the second sliding block, and having both ends respectively connected with the first sliding block and the second sliding block.

In some embodiments, there further includes: a goods replenishing device at least partially arranged in the building for receiving goods replenished from the outside.

In some embodiments, the goods replenishing device includes: a goods replenishing door openably and closably arranged on an external wall of the building; a rotary container having a plurality of storage grids for storing replenished goods, and rotatably arranged in the building; wherein the rotary container is located between the goods replenishing door and the storage space, such that by rotating the rotary container the storage grids that has been replenished with the goods from one side where the goods replenishing door is located are transferred to one side where the storage space is located, and empty storage grids of the rotary container are transferred to one side where the goods replenishing door is located.

In some embodiments, a rotation axis of the rotary container is perpendicular to a floor inside the building, and the goods replenishing door is configured to expose at least one vertical row of storage grids of the rotary container.

In some embodiments, respective storage grids in the rotary container are divided into a plurality of storage areas classified according to different types of goods.

In some embodiments, there further includes a goods replenishing device at least partially arranged in the building and configured to receive goods replenished from the external, wherein the track is also located between the storage space and the goods replenishing device, and the stacking robot is further configured to sort the goods received by the goods replenishing device to a corresponding position in the storage space.

In some embodiments, the storage space includes a plurality of goods grids for storing goods, which are distributed on at least one side of an interior of the building.

In some embodiments, a wall of the building is enclosed in a rectangle or a rounded rectangle, and the distribution interface area and the goods replenishing device are respectively arranged at both ends of the building along a length direction of the building, the storage space is arranged at at least one end of the building in a width direction of the building, and the goods sorting device runs among the distribution interface area, the goods replenishing device and the storage space.

In some embodiments, there further includes: a client self-picking mechanism having an operation interface and a goods self-picking port, and arranged outside the building, wherein the goods sorting device is further configured to sort corresponding goods in the storage space to the goods self-picking port according to a picking instruction inputted by the client in the operation interface.

In some embodiments, there further includes: an automatic vending device having an operation interface and a product exporting port, and arranged outside the building, wherein the goods sorting device is further configured to sort a corresponding goods in the storage space as products to the product exporting port according to a purchase instruction inputted by the client in the operation interface.

In some embodiments, there further includes: a client dispatching mechanism having an operation interface and a goods placing port, and arranged outside the building, wherein the goods sorting device is further configured to sort the goods received by the goods placing port to corresponding positions in the storage space according to a dispatching instruction inputted by the client in the operation interface.

In some embodiments, an information display area is provided on an external wall of the building.

In some embodiments, an access door for entry and exit of staff is provided on an external wall of the building.

In one aspect of the present disclosure, a distribution method based on the foregoing distribution site is provided. The method includes: loading the goods in the storage space corresponding to a distribution task onto the unmanned ground distribution vehicle through the goods sorting device when the unmanned ground distribution vehicle enters the distribution interface area, so that the unmanned ground distribution vehicle distributes the goods to a target position according to the distribution task.

In some embodiments, the distribution site further includes a goods replenishing device, and the distribution method further includes: receiving the goods replenished from the external through the goods replenishing device; and sorting the goods received by the goods replenishing device to a corresponding position of the storage space by the goods sorting device.

BRIEF DESCRIPTION OF THE DRAWINGS

The accompanying drawings, which constitute part of this specification, illustrate exemplary embodiments of the present disclosure, and together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The distribution sites in the related art are generally a plurality of network sites established in cities, and each network site is deployed with relevant staff so that labor is responsible for transferring goods or helping clients to pick up goods. After research by the inventors, it has been found that although there is an application mode of using a drone or a unmanned ground vehicle for goods distribution in related technologies, such application method still depends on manual participation, which results in high cost and low efficiency. Moreover, whether the distribution of goods is successful or not is restricted by the quality of the operators to a certain extent.

In view of this, the embodiments of the present disclosure provide a distribution site and a distribution method, which can reduce dependence on labor.

Figure 1:
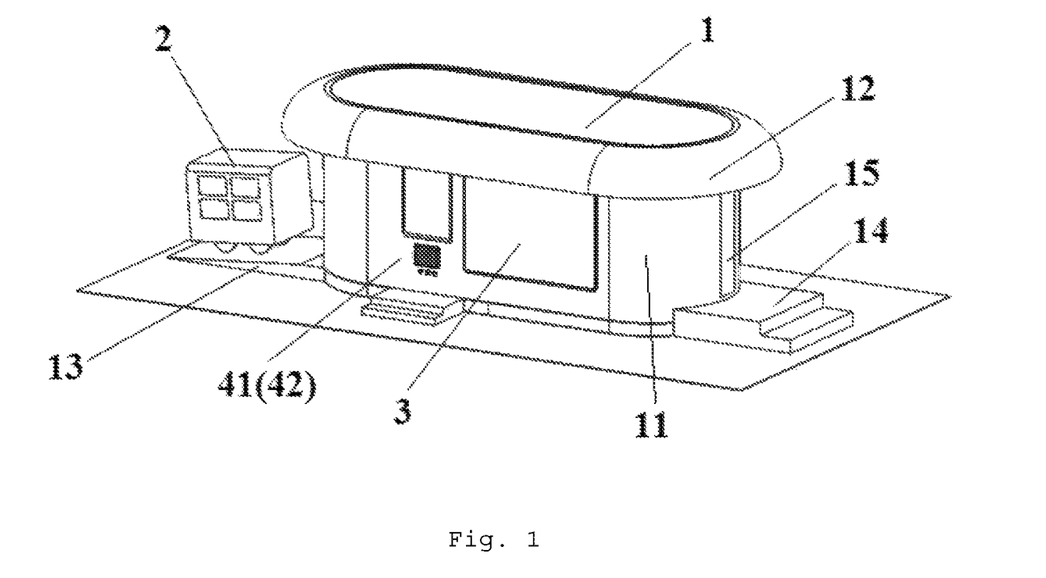
FIG. 1 is a schematic view of an external structure in some embodiments of the distribution site according to the present disclosure.

As shown in FIG. 1, it is a schematic view of an external structure in some embodiments of the distribution site according to the present disclosure. Referring to FIG. 1 in conjunction with FIGS. 2 to 11, in some embodiments, the distribution site includes: a building 1 and a goods sorting device 8. The building 1 has a storage space 9 for storing goods and a distribution interface area for parking an unmanned ground distribution vehicle 2 that can perform goods distribution. The building 1 may be a stationary building structure that is fixedly constructed on the ground, a movable traveling building structure, or a combined structure of a stationary building structure and a traveling building structure.

The goods sorting device 8 is arranged in the building 1 and may load the goods in the storage space 9 onto the unmanned ground distribution vehicle 2 when the unmanned ground distribution vehicle 2 is parked in the distribution interface area. The unmanned ground distribution vehicle 2 here may include an unmanned driving vehicle or a remotely controlled truck. In this embodiment, the storage space and the distribution interface area are arranged in the building of the distribution site, and the goods in the storage space are loaded onto the unmanned ground distribution vehicle that is parked at the distribution interface area through the goods sorting device, thereby lowering the dependence on labor during transportation of the goods from the distribution site to the external and loading and unloading of the goods in the distribution site, improving the distribution efficiency and reducing the labor cost.

Figure 3:
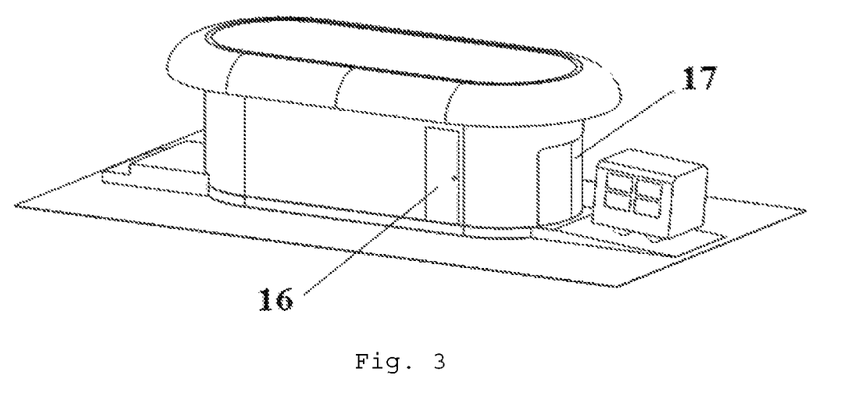
FIGS. 3-5 are schematic views of an external structure in some embodiments of the distribution site according to the present disclosure from different perspectives respectively.
Figure 4:
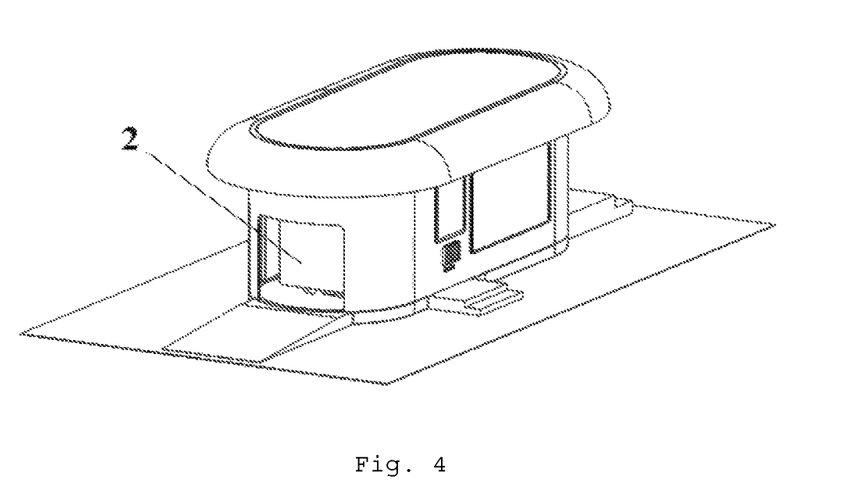
Figure 6:
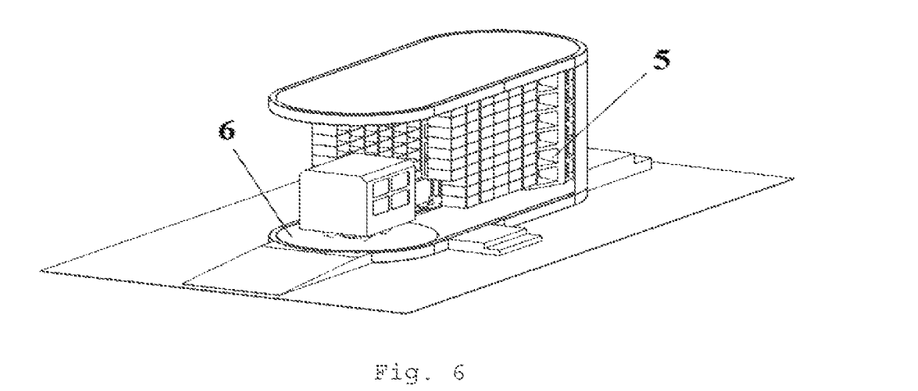
FIGS. 6-7 are schematic views of a process of adjusting a position of an unmanned ground distribution vehicle in some embodiments of the distribution site according to the present disclosure respectively.
Figure 7:
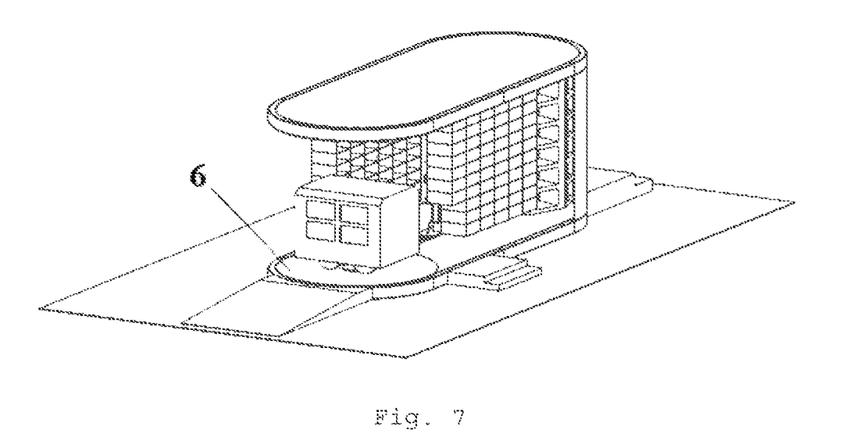
Figure 8:
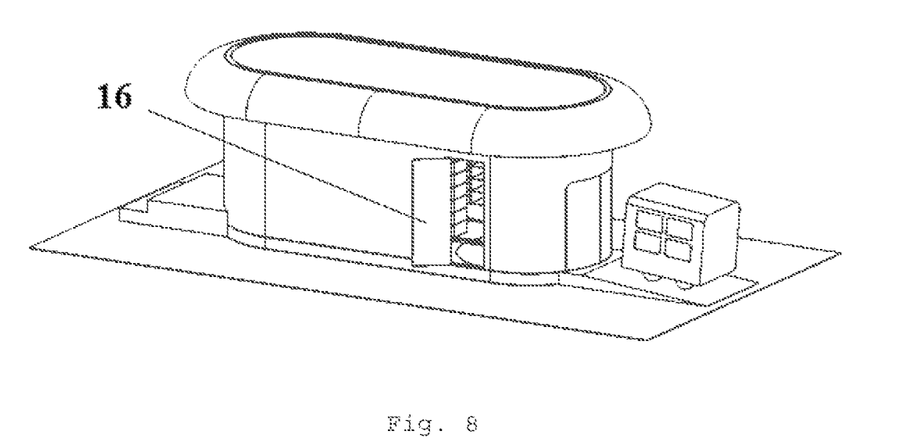
FIG. 8 is a schematic structural view of an access door in some embodiments of the distribution site according to the present disclosure.

The distribution interface area may be located in the building 1, which is provided with a passage/door 17 communicating the external with the distribution interface area (see FIG. 3). The door 17 may be automatically opened when the unmanned ground distribution vehicle 2 enters into or exits from the distribution site, and closed at other times. Referring to FIGS. 6 and 7, the distribution site may include a vehicle adjusting mechanism 6. The vehicle adjusting mechanism 6 is arranged in the distribution interface area and configured to adjust a position of the unmanned ground distribution vehicle 2 entering the distribution interface area. The vehicle adjusting mechanism 6 may include a rotary platform provided on the floor of the distribution interface area. After the unmanned ground distribution vehicle 2 moves onto the rotary platform, the rotary platform may rotate about an axis perpendicular to the horizontal plane, so that the angle of the unmanned ground distribution vehicle 2 above the rotary platform relative to the goods sorting device 8 may be adjusted by rotation so as to facilitate loading the goods.

In order to allow a smoother loading process of the unmanned ground distribution vehicle 2, a visual device may be provided inside the building 1. The visual device may be configured to recognize a position of the unmanned ground distribution vehicle 2 entering the distribution interface area, so that the vehicle adjusting mechanism 6 adjusts a position of the unmanned ground distribution vehicle 2 according to a recognition result of the visual device. In this way, it is not only possible to facilitate the vehicle adjusting mechanism 6 to accurately adjust the unmanned ground distribution vehicle 2, but also to allow the goods sorting device 8 to load the goods onto the unmanned ground distribution vehicle 2 more accurately.

Referring to FIGS. 1 to 4 and FIG. 6 to FIG. 7, the unmanned ground distribution vehicle 2 when assigned to the distribution site according to a distribution instruction, may move along a slope 13 on one side of the distribution site to the outside of the door 17 of the building 1. When the door 17 is opened, the unmanned ground distribution vehicle 2 may travel into the interior of the distribution site and be parked above the vehicle adjusting mechanism 6 in the distribution interface area. Referring to FIG. 6, if a direction of movement of the wheels of the unmanned ground distribution vehicle 2 is different from an orientation of the goods entrance 21 provided on the unmanned ground distribution vehicle 2, it is necessary to rotate the unmanned ground distribution vehicle 2 to a specific angle by the vehicle adjusting mechanism 6 so that the goods entrance 31 faces towards an interior of the building 1, thereby facilitating the goods sorting device 8 to load the goods to the goods entrance 31.

When good loading is completed, the vehicle adjusting mechanism 6 may rotate the unmanned ground distribution vehicle 2 to a direction that facilitates the wheels to exit from the distribution site. In addition, for an unmanned ground distribution vehicle 2 having a plurality of sides for carrying goods, different sides required to be loaded with goods may also be rotated by the vehicle adjusting mechanism 6 to corresponding directions in sequence, thereby allowing a more convenient and automated loading process.

Figure 2:
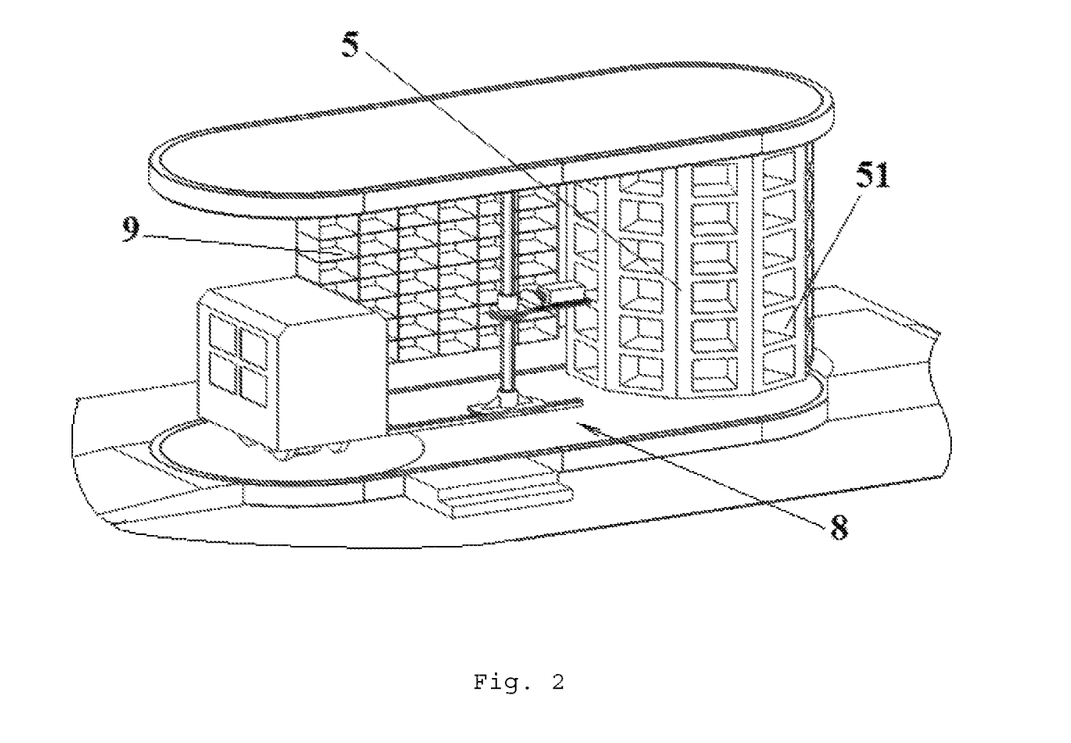
FIG. 2 is a schematic view of an internal structure in some embodiments of the distribution site according to the present disclosure.
Figure 11:
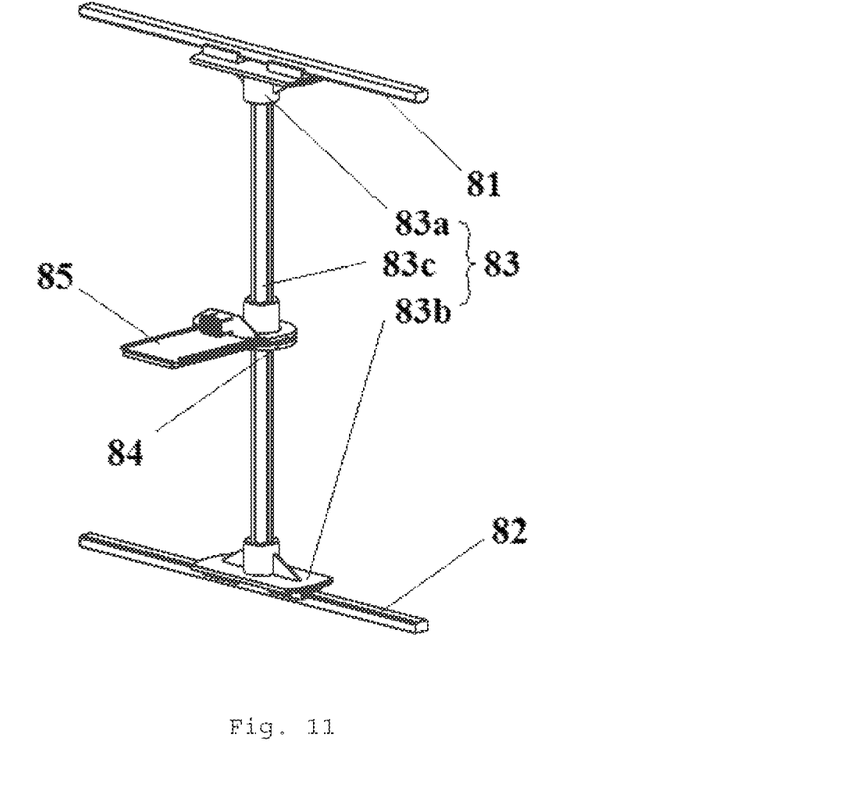
FIG. 11 is a schematic structural view of a goods sorting device in some embodiments of the distribution site according to the present disclosure.

Referring to FIGS. 2 and 11, in some embodiments, the goods sorting device 8 includes: a track and a stacking robot. The track is arranged in the building 1 and located between the storage space 9 and the distribution interface area. For example, the track may be arranged on a floor or side wall in the building as required, or on a top ceiling or an internal facility of the building as required. The stacking robot runs movably along the track, and configured to load the goods in the storage space 9 onto the unmanned ground distribution vehicle 2.

In some embodiments, the stacking robot may include: a bracket 83, a rotary seat 84, and an end picker 85. In this structure, the bracket 83 runs movably along the track. For example, the track in FIG. 11 may include: a first track 81 and a second track 82. The first rail 81 is arranged on the top ceiling inside the building 1. The second rail 82 is arranged on the floor inside the building 1, and is parallel to and directly opposite to the first rail 81. Correspondingly, the bracket 83 may include: a first sliding block 83a, a second sliding block 83b, and a support rod 83c. The first sliding block 83a and the first rail 81 form a sliding pair. The second sliding block 83b and the second rail 82 form a sliding pair. The support rod 83c may be arranged upright between the first sliding block 83a and the second sliding block 83b, and has both ends respectively connected with the first sliding block 83a and the second sliding block 83b. Such matching structure between the bracket and the track is relatively stable, and the operation is relatively smooth.

Figure 9:
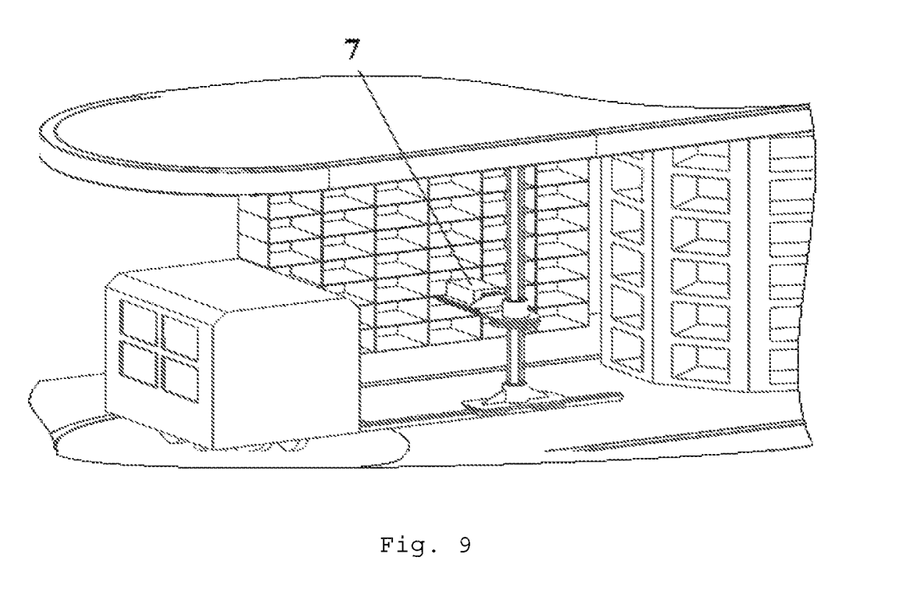
FIGS. 9-10 are schematic views of a process of loading an unmanned ground distribution vehicle by a goods sorting device in some embodiments of the distribution site according to the present disclosure respectively.
Figure 10:
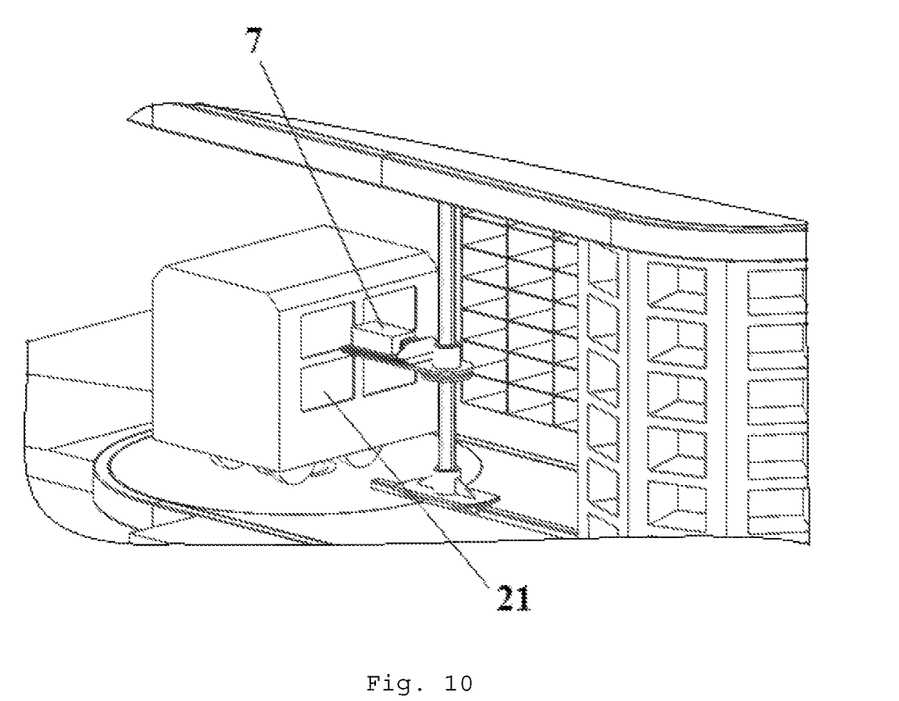

The rotary seat 84 which is arranged on the bracket 83 and rotatable in a horizontal direction relative to the bracket, may move linearly in a vertical direction. The end picker 85 is arranged on the rotary seat 84 and configured to pick up or release the goods. Referring to FIGS. 9 and 10, when there is a need to load the goods, the support rod 83c of the goods sorting device may move to a corresponding position of a designated goods grid in the storage space according to an instruction. The rotary seat 84 may turn to a direction facing the goods grid, and ascend or descend along the support rod 83c to a height of the goods grid. Then, the goods are picked up from the goods grid by the end picker 85.

After the end picker 85 take outs the goods, the support rod 83c then moves to one side where the unmanned ground distribution vehicle 2 is located. The rotary seat 84 turns to face the unmanned ground distribution vehicle 2, and at the same time ascends or descends to a corresponding height of the designated goods entrance 21 of the unmanned ground distribution vehicle 2, and then releases the goods into the goods entrance 21 through the end picker 85, thereby completing the loading process.

The goods in the distribution site may be replenished in various ways, For example, the goods are manually replenished into the distribution site from the external, or the goods are replenished through a drone, an unmanned ground vehicle, or a remote transmission mechanism such as a belt conveyor system. In some embodiments of the present disclosure, the distribution site may also include a goods replenishing device. The goods replenishing device may be at least partially arranged in the building 1 for receiving goods replenished from the external.

Referring to FIG. 2, in some embodiments, the storage space 9 in the building 1 may include a plurality of goods grids for storing goods. These goods grids may be distributed on at least one side inside the building 1. The wall of the building 1 may be enclosed in a rectangle or a rounded rectangle, and the distribution interface area and the goods replenishing device may be respectively arranged at both ends of the building 1 along a length direction of the building 1, and the storage space 9 is arranged at at least one end of the building 1 in a width direction of the building 1. The goods sorting device 8 runs among the distribution interface area, the goods replenishing device and the storage space 9.

Figure 5:
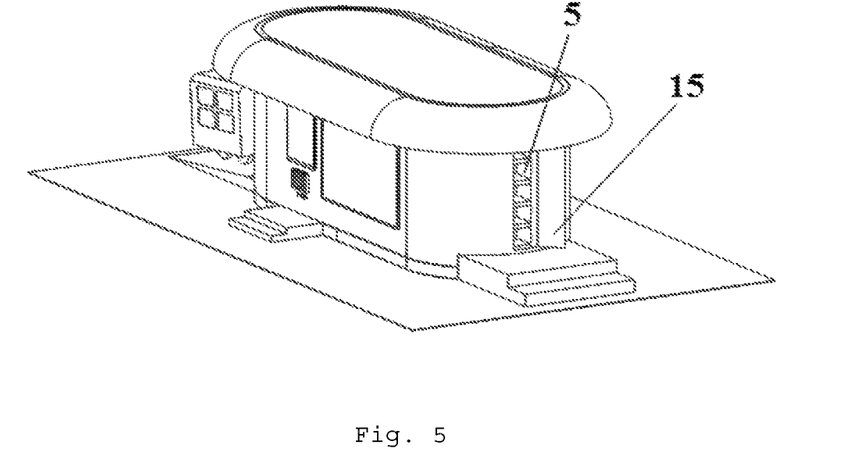

Referring to FIGS. 1 and 5, in some embodiments, in order to increase the capacity of the goods and avoid occupying much space in the distribution site, the goods replenishing device may include: a goods replenishing door 15 and a rotary container 5. The goods replenishing door 15 may be openably and closably arranged on an external wall of the building 1. Stairs 14 may also be provided on one side of the goods replenishing door 15 to facilitate walking by the staff.

The rotary container 5 has a plurality of storage grids 51 for storing replenished goods, and is rotatably arranged in the building 1. The rotary container 5 is located between the goods replenishing door 15 and the storage space 9. By rotating the rotary container 5, the storage grids 51 that has been replenished with the goods from one side where the goods replenishing door 15 is located are transferred to one side where the storage space is located, and the empty storage grids 51 of the rotary container 5 are transferred to one side where the goods replenishing door 15 is located. By means of such rotary structure, it is possible to effectively reduce the occupied space and increase the capacity of the goods.

During the replenishment process, the staff does not need to enter into an interior of the distribution site, but only needs to open the goods replenishing door 15 and place the goods in the storage grids 51 exposed on the rotary container 5. The storage grids 51 where the goods have been placed may turn to one side in the building 1 adjacent to the storage space 9 as the rotary container 5 rotates. At this time, the goods sorting device 8 may be used to sort the goods into the storage space 9. Referring to FIG. 2, the track may also be located between the storage space 9 and the goods replenishing device. The stacking robot is further configured to sort the goods received by the goods replenishing device to a corresponding position in the storage space 9.

In order to prevent the goods from falling when the rotary container 5 rotates, the rotation axis of the rotary container 5 is preferably perpendicular to the floor inside the building 1. Correspondingly, the goods replenishing door 15 may be configured to expose at least one vertical row of storage grids 51 of the rotary container 5. After placing goods in at least one vertical row of exposed storage grids 51 from the external of the goods replenishing door 15, the staff may await the rotary container 5 to rotate until the other rows of empty storage grids 51 are exposed before continuing the placement. At the same time, the goods sorting device inside the distribution site may performs a sorting operation on the goods in the storage grids 51 that has turned to the inside at the same time, thereby greatly improving the replenishing efficiency.

In other embodiments, respective storage grids 51 in the rotary container 5 may also be divided into a plurality of storage areas classified according to different types of goods. In this way, the operator may place the same type of goods in a corresponding storage area, so as to facilitate the goods sorting device to sort the goods.

In addition to being delivered to a target position or a target client through the distribution vehicle 3, the goods stored in the distribution site may also be picked up by the client, that is, the client directly obtains goods from the distribution site. Referring to FIG. 1, in some embodiments, the distribution site may further include: a client self-picking mechanism 41. The client self-picking mechanism 41 which has an operation interface and a goods self-picking port is arranged outside the building 1. The client may head for a designated distribution site according to a notification received in SMS, WeChat or other forms, and input a picking instruction into the operation interface according to the notification. The goods sorting device 8 may sort a corresponding goods in the storage space 9 to the self-picking port according to the picking instruction inputted by the client in the operation interface. Compared with the existing goods self-picking cabinet, only a single or a small number of goods self-picking ports are required to realize the self-picking function of a plurality of goods stored in the distribution site, thereby saving an area occupied by the client self-picking mechanism 41 on an external wall of the building and thus improving the space utilization of the external wall.

In addition to self-picking the goods, the client may also purchase products through the distribution site. In some embodiments, referring to FIG. 1, the distribution site may further include: an automatic vending device 42. The automatic vending device 42 which has an operation interface and a product exporting port is arranged outside the building 1. When the client inputs a purchase instruction for a specific product in the operation interface, the goods sorting device 8 may sort a corresponding goods in the storage space 9 as products to the product exporting port according to the purchase instruction inputted by the client in the operation interface.

In addition, the client may also place a delivery order through the distribution site. In some embodiments, the distribution site may also include a client dispatching mechanism having an operation interface and a goods placing port and arranged outside the building 1. When the client inputs a dispatching instruction for goods brought by the client in the operation interface, the goods sorting device 8 may sort the goods received by the goods placing port to a corresponding position in the storage space 9 according to the dispatching instruction inputted by the client in the operation interface. In this way, the goods may be loaded onto the unmanned ground distribution vehicle 2 by the goods sorting device and transported to a preset target position.

In order to make full use of an external space of the distribution site, an information display area 3 may also be provided on an external wall of the building 1, for displaying static or dynamic advertisements, notices, programs, and the like, so as to more effectively utilize an external space of the building 1. In addition, referring to FIG. 8, an access door 16 for entry and exit of staff may also be provided on an external wall of the building 1 so that maintenance staff may enter the building 1 in time for device maintenance or troubleshooting.

Based on the embodiments of the above-described distribution site of the present disclosure, the present disclosure also provides a corresponding distribution method. For example, in some embodiments, the distribution method includes: loading the goods in the storage space 9 corresponding to a distribution task onto the unmanned ground distribution vehicle 2 through the goods sorting device 8 when the unmanned ground distribution vehicle 2 enters the distribution interface area, so that the unmanned ground distribution vehicle 2 distributes the goods to a target position according to the distribution task.

Referring to FIG. 1, the unmanned ground distribution vehicle 2 may head for a designated distribution site according to a dispatching instruction of the system. The system may also communicate with the distribution site to obtain a storage condition of the distribution site, so as to arrange the unmanned ground distribution vehicle 2 to distribute the goods in time. When the unmanned ground distribution vehicle 2 heads for the distribution site, it is also possible to communicate with the distribution site so as to confirm whether the distribution site currently possess a parking condition. When there is another unmanned ground distribution vehicle in the distribution site, it is possible to await its leaving before entering the distribution site.

When the unmanned ground distribution vehicle 2 has arrived at the distribution site, the unmanned ground distribution vehicle 2 may communicate with the distribution site so that the distribution site opens the passage/door 17, which allows the unmanned ground distribution vehicle 2 to enter a distribution interface area inside the building 1. The distribution site may also automatically detect or authenticate an incoming unmanned ground distribution vehicle 2 to determine whether it is qualified for access, and open the passage/door 17 after qualification.

After the unmanned ground distribution vehicle 2 is parked in the distribution interface area, the passage/door 17 may be closed in time to prevent access of unauthorized personnel at this occasion. For a distribution site with a visual device, the visual device may recognize a position of the unmanned ground distribution vehicle 2 entering the distribution interface area. Based on the position information obtained by recognition, the vehicle adjusting mechanism 6 may adjust a position of the unmanned ground distribution vehicle 2, so that the goods entrance where the goods are loaded is at a convenient position for loading. If the unmanned ground distribution vehicle 2 has a plurality of loading sides, the vehicle adjusting mechanism 6 may adjust a position of the unmanned ground distribution vehicle 2 for multiple times.

The goods sorting device 8 may be a stacking robot, or other automatic devices such as a six-axis robot. The stacking robot may pick up the goods from the storage space and load the goods directly onto the unmanned ground distribution vehicle 2. After the loading of the unmanned ground distribution vehicle 2 is completed, the vehicle adjusting mechanism 6 may adjust a position of the unmanned ground distribution vehicle 2, so that the unmanned ground distribution vehicle 2 is in a position convenient for exiting from the distribution site. After the unmanned ground distribution vehicle 2 exits, the passage/door 17 may be closed in time to prevent access of unauthorized personnel at this occasion.

In order to conveniently replenish goods into the distribution site, in some embodiments of the distribution site, a goods replenishing device is also included. The corresponding distribution method may further include: receiving the goods replenished from the external through the goods replenishing device; sorting the goods received by the goods replenishing device to a corresponding position of the storage space 9 by the goods sorting device 8.

Referring to FIGS. 1 and 5, the staff may walk up the stairs 14 to open the goods replenishing door 15. At this time, at least one row of storage grids 51 of the rotary container 5 are exposed from the elongated goods replenishing door 15. The staff may place the goods into each empty storage grid 51 sequentially, and then the rotary container 5 is operated so that it is rotated to another angle. Alternatively, the rotary container 5 may be driven to rotate by a built-in driving mechanism of the goods replenishing device. In this way, at least one remaining row of empty storage grids 51 are exposed by rotation so that the staff may continue to place the goods into the storage grids 51.

The portion of the rotary container 5 that has turned to the inside may be picked up by the end picker of the stacking robot and the picking goods are placed into a corresponding goods grid in the storage space. The above-described process is recycled so that it is possible to realize rapid replenishment and storage of the goods, thereby greatly improving the operation efficiency.

When the client heads for the distribution site to self-pick up goods, dispatch goods, or purchase products, the goods or products may be transferred by the goods sorting device 8 according to a relevant instruction inputted by the client in the operation interface (for example, a picking instruction, a dispatching instruction, or a purchase instruction). The goods self-picking port, the goods placing port and the product exporting port here may share the same port or independently set. Each operation panel may be set independently, and may also incorporate the purposes for a client self-picking mechanism, a client dispatching mechanism, and an automatic vending device.

A plurality of embodiments in the present description are described in a progressive manner with different focuses respectively. For the same or similar parts between the respective embodiments, cross-reference may be made. For the embodiments of the method, since the method as a whole and the steps involved therein are in a relationship corresponding to the content in the embodiments of the device, such embodiments are described in a relatively simple manner. For the relevant aspects, reference may be made to some of the descriptions of the embodiments of the device.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A distribution site, comprising:
a building having a storage space configured to store goods and a distribution interface area configured to park an unmanned ground distribution vehicle that is capable of performing goods distribution;
a goods sorting device arranged in the building and configured to load the goods in the storage space onto the unmanned ground distribution vehicle; and
a goods replenishing device at least partially arranged in the building for receiving goods replenished from the outside,
wherein the goods replenishing device comprises:
a goods replenishing door openably and closably arranged on an external wall of the building; and
a rotary container having a plurality of storage grids configured to store replenished goods, and rotatably arranged in the building,
wherein the rotary container is located between the goods replenishing door and the storage space, such that by rotating the rotary container, the storage grids that has been replenished with the goods replenished from one side where the goods replenishing door is located are transferred to one side where the storage space is located, and empty storage grids of the rotary container are transferred to one side where the goods replenishing door is located.

2. The distribution site according to claim 1, further comprising:
a vehicle adjusting mechanism arranged in the distribution interface area and configured to adjust a position of the unmanned ground distribution vehicle entering the distribution interface area, so that the goods sorting device performs loading.

3. The distribution site according to claim 2, wherein the vehicle adjusting mechanism comprises:
a rotary platform configured to rotate about an axis perpendicular to a horizontal plane, so as to adjust an angle of the unmanned ground distribution vehicle above the rotary platform relative to the goods sorting device by rotation.

4. The distribution site according to claim 2, further comprising:
a visual device arranged in the building and configured to recognize a position of the unmanned ground distribution vehicle entering the distribution interface area, so that the vehicle adjusting mechanism adjusts a position of the unmanned ground distribution vehicle according to a recognition result of the visual device.

5. The distribution site according to claim 1, wherein the goods sorting device comprises:
a track arranged in the building and located between the storage space and the distribution interface area; and
a stacking robot running movably along the track, and configured to load the goods in the storage space onto the unmanned ground distribution vehicle.

6. The distribution site according to claim 5, wherein the stacking robot comprises:
a bracket running movably along the track;
a rotary seat which is arranged on the bracket, rotatable in a horizontal direction relative to the bracket, and movable linearly in a vertical direction; and
an end picker arranged on the rotary seat and configured to pick up or release the goods.

7. The distribution site according to claim 6, wherein the rail comprises:
a first rail arranged on a top ceiling inside the building; and
a second rail arranged on a floor inside the building, and parallel to and directly opposite to the first rail.

8. The distribution site according to claim 7, wherein the bracket comprises:
a first sliding block forming a sliding pair with the first rail;
a second sliding block forming a sliding pair with the second rail; and
a support rod arranged upright between the first sliding block and the second sliding block, and having both ends respectively connected with the first sliding block and the second sliding block.

9. The distribution site according to claim 8, wherein a wall of the building is enclosed in a rectangle or a rounded rectangle, and the distribution interface area and the goods replenishing device are respectively arranged at both ends of the building along a length direction of the building, the storage space is arranged at at least one end of the building in a width direction of the building, and the goods sorting device runs among the distribution interface area, the goods replenishing device and the storage space.

10. The distribution site according to claim 5, further comprising a goods replenishing device at least partially arranged in the building and configured to receive goods replenished from the external,
wherein the track is also located between the storage space and the goods replenishing device, and the stacking robot is further configured to sort the goods received by the goods replenishing device to a corresponding position in the storage space.

11. The distribution site according to claim 1, wherein a rotation axis of the rotary container is perpendicular to a floor inside the building, and the goods replenishing door is configured to expose at least one vertical row of storage grids of the rotary container.

12. The distribution site according to claim 1, wherein respective storage grids in the rotary container are divided into a plurality of storage areas classified according to different types of goods.

13. The distribution site according to claim 1, wherein the storage space comprises a plurality of goods grids for storing goods, which are distributed on at least one side of an interior of the building.

14. The distribution site according to claim 1, further comprising:
- a client self-picking mechanism having an operation interface and a goods self-picking port, and arranged outside the building,
- wherein the goods sorting device is further configured to sort corresponding goods in the storage space to the goods self-claiming port according to a picking instruction inputted by the client in the operation interface.

15. The distribution site according to claim 1, further comprising:
- an automatic vending device having an operation interface and a product exporting port, and arranged outside the building,
- wherein the goods sorting device is further configured to sort corresponding goods in the storage space as products to the product exporting port according to a purchase instruction inputted by the client in the operation interface.

16. The distribution site according to claim 1, wherein an access door for entry and exit of staff is provided on an external wall of the building.

17. A distribution method based on the distribution site according to claim 1, comprising:
- loading the goods in the storage space corresponding to a distribution task onto the unmanned ground distribution vehicle through the goods sorting device when the unmanned ground distribution vehicle enters the distribution interface area, so that the unmanned ground distribution vehicle distributes the goods to a target position according to the distribution task.

18. The distribution site according to claim 17, wherein the distribution site further comprises a goods replenishing device, and the distribution method further comprises:
- receiving the goods replenished from the external through the goods replenishing device; and
- sorting the goods received by the goods replenishing device to a corresponding position of the storage space by the goods sorting device.

* * * * *